US011232414B2

(12) United States Patent
Metnick et al.

(10) Patent No.: US 11,232,414 B2
(45) Date of Patent: Jan. 25, 2022

(54) CRYPTOCURRENCY VERIFICATION SYSTEM

(71) Applicant: Raise Marketplace Inc., Chicago, IL (US)

(72) Inventors: Josh Metnick, Chicago, IL (US); Ryan Chiu, Grayslake, IL (US); Alexander Oliver Smith, Chicago, IL (US); Ethan Gordon, Buffalo Grove, IL (US)

(73) Assignee: Raise Marketplace Inc., Chicago, IL (US)

( * ) Notice: Subject to any disclaimer, the term of this patent is extended or adjusted under 35 U.S.C. 154(b) by 1320 days.

(21) Appl. No.: 14/791,781

(22) Filed: Jul. 6, 2015

(65) Prior Publication Data

US 2016/0203448 A1 Jul. 14, 2016

Related U.S. Application Data

(60) Provisional application No. 62/020,995, filed on Jul. 3, 2014.

(51) Int. Cl.
*G06Q 20/06* (2012.01)
*G06Q 20/40* (2012.01)
*H04L 9/32* (2006.01)
*H04L 29/06* (2006.01)

(52) U.S. Cl.
CPC ........... *G06Q 20/065* (2013.01); *G06Q 20/40* (2013.01); *G06Q 20/401* (2013.01); *H04L 9/3247* (2013.01); *H04L 63/06* (2013.01); *G06Q 2220/00* (2013.01); *H04L 2209/56* (2013.01)

(58) Field of Classification Search
USPC .......................... 705/64, 65–69, 75
See application file for complete search history.

(56) References Cited

U.S. PATENT DOCUMENTS 6,539,364 B2 * 3/2003 Moribatake ............ G06Q 20/02
705/1.1
10,068,228 B1 * 9/2018 Winklevoss ............ H04L 9/085
(Continued)

FOREIGN PATENT DOCUMENTS

WO WO-2006016850 A1 * 2/2006 ........... H04L 9/3226

OTHER PUBLICATIONS

Rohunen et al., "Implementing and evaluating a Smart-M3 platform-based multi-vendor micropayment system pilot in the context of small business", Journal of Digital Information Management 12.1: 44(8). Digital Information Research Foundation. (Feb. 2014).*

*Primary Examiner* — Jamie R Kucab
*Assistant Examiner* — Clay Lee
(74) *Attorney, Agent, or Firm* — Garlick & Markison; Timothy W. Markison; Timothy D. Taylor (57) ABSTRACT

A machine and process for making and for using a machine. The process includes receiving, by the computer over a network, a notification of a payment comprising an amount of cryptocurrency and a first cryptocurrency address, and effectuating, by the computer, the purchase by using the amount and the cryptocurrency address from which a first public key can be derived, and applying the computer system to verifying that a digitally represented human or entity purporting to have made a purchase with cryptocurrency is entitled to obtain value for the purchase.

12 Claims, 4 Drawing Sheets

(56) References Cited

U.S. PATENT DOCUMENTS

| | | | | |
|---|---|---|---|---|
| 2006/0095388 A1* | 5/2006 | Brown | ............... | H04L 9/00 |
| | | | | 705/67 |
| 2009/0048979 A1* | 2/2009 | Al-Herz | ............ | G06Q 20/06 |
| | | | | 705/67 |
| 2014/0095886 A1* | 4/2014 | Futral | ............ | G06F 21/572 |
| | | | | 713/187 |
| 2014/0143155 A1* | 5/2014 | Karlov | ............ | G04G 99/006 |
| | | | | 705/71 |
| 2014/0164251 A1* | 6/2014 | Loh | ............ | G06Q 20/065 |
| | | | | 705/67 |
| 2015/0363777 A1* | 12/2015 | Ronca | ............ | H04L 9/3236 |
| | | | | 705/75 |
| 2016/0085955 A1* | 3/2016 | Lerner | ............ | G06F 21/725 |
| | | | | 726/20 |

* cited by examiner

CRYPTOCURRENCY VERIFICATION SYSTEM

I. PRIORITY STATEMENT

The present patent application claims benefit from, and incorporates by reference from as if fully restated herein, Ser. No. 62/020,995, filed Jul. 3, 2014.

III. MODES

The accompanying drawings illustrate embodiments intended to illustrate and exemplify in a teaching manner, by way of the prophetic teachings herein. In greater detail, consider now without limitation, a machine, manufacture, article (including computer-readable media tangibly embodying program instructions), process (making and using), and product produced thereby, including necessary intermediates. The forgoing embodiments can, but need not always, relate to a digital calculator which can be configured, for example, in hardware, software, or a combination thereof, embodied in transforming data by digital operations.

As used herein, the term "computer" generally refers to hardware or hardware in combination with one or more program(s), such as can be implemented in software. Computers can be implemented as general-purpose computers, specialized devices, or a combination of general-purpose and specialized computing devices. Computing devices can be implemented electrically, optically, quantumly, biologically, and/or mechanically or in any combination of these technologies. A computer as used herein can be viewed as at least one computer having all functionality or as multiple computers with functionality separated to collectively cooperate to bring about the functionality. This includes single processor and multi-processor implementations of a computer. A processor can include any device that processes information or executes instructions. Computer logic flow and operations can be used in processing devices, including but not limited to: signal processors, data processors, microprocessors, and communication processors. Logic flow can be implemented in discrete circuits, combinational logic, ASICs, FPGAs, reconfigurable logic, programmed computers, or an equivalent.

Computer-readable media or medium, as used herein (illustrated in FIG. 1 as media 61), includes any technology that includes a characteristic of memory, e.g., a tangible storage medium, which can be read by a computer. Memory technologies can be implemented using magnetic, optical, mechanical, or biological characteristics of materials. Common examples of memory are RAM, ROM, PROM, EPROM, FPGA, and floppy or hard disks. Communications medium or connection, as used herein, is any pathway or conduit in which information can be communicated or exchanged. The pathway or conduit can be wired, optical, fluidic, acoustic, wireless, or any combination of the foregoing.

The computer system(s) can include one or more computers, which illustratively can be PC systems or server systems, and any combination of the foregoing. Depending on the implementation, computers can be adapted to communicate among themselves, or over a network such as the Internet. Programs, as used herein, are instructions that when executed by a processing device causes the processor to perform specified operations. Programs can be written in various languages, including but not limited to assembly, COBOL, FORTRAN, BASIC, C, C++, or Java. Languages can be object oriented like C++ and Java, for example. The programming language can be interpretive or compiled, or a combination of both. The programs are usually processed by a computing system having an operating system. An operating system can be processor specific, like an RTOS (real time operating system) used in cell phones, or commercial like OSX, UNIX, Windows, or LINUX. An operating system or program can be hardwired, firmware, reside in memory or be implemented in an FPGA or reconfigurable logic.

Figure 1:
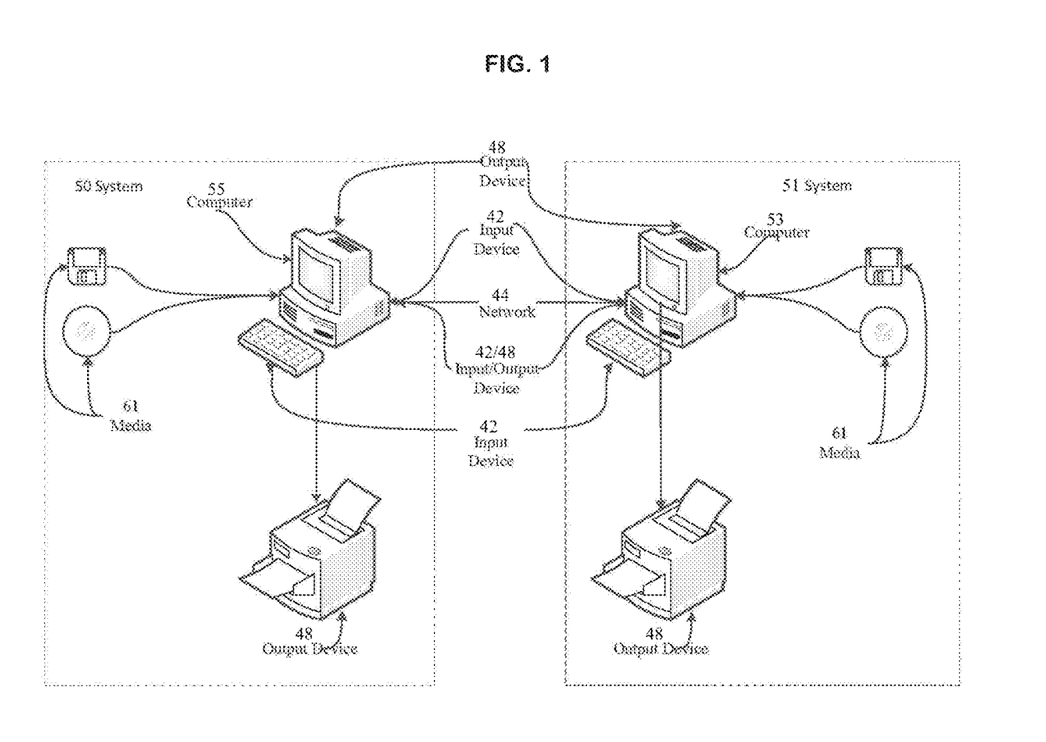
FIG. 1 is an illustration with regard to computer(s) and interconnections.

By way of a high level overview, FIG. 1 illustrates a computer system 50, which can, if so desired, interact with potential illustrative computer system 51 via a network 44. For example, a computer system 50 and/or 51 can each comprise a computer 53 (e.g., an IBM, Hewlett Packard, MAC, or other personal computer, a mainframe, distributed computing, etc.) with one or more processors (e.g., an Intel or AMD series processor or the like) a memory (e.g., RAM, a hard drive, disk drive, etc.) (not illustrated in FIG. 1), one or more input devices 42 (e.g., keyboard, mouse, modem, or the like), and one or more output devices 48 (e.g., a modem, a Hewlett Packard printer, a Dell monitor, or other such output device). Note that a modem or router or gateway 42/48 are each illustrative of a computer-to-computer communication device that can operate as an input/output device. To provide other illustrative embodiments, the computer system(s) 50/51 can comprise at least one of a desktop computer, a telephonic device, a console, a laptop computer, and a mobile communication device. The mobile communication device can comprise at least one of a cellular telephone, laptop, a PDA, and an ! Phone-type device. Communications between devices may be wired, for example cabled Ethernet based home or office network, wireless through IEEE 802.11 a/b/g network cards or Bluetooth, or optical through an IR port. Networking between devices may be through WANs, LANs, Intranets, Internet or peer-to-peer arrangements, or in a combination of them. The network 44 may include, for example, gateways, routers, bridges, switches, front end and back end servers, IPS (Internet service providers), which may interact with content provider servers, scanners, copiers, printers and user computing devices. Devices on the network may include interfaces that can be as simple, such as a keyboard with an LCD screen, or can be complex, such as a web interface. Web interfaces are presented in a web browser environment. Web browsers render XML or HTML containing pictures and links in a window on the desktop, for example like Windows XP, Firefox, Mozilla, Internet Explorer, and Safari are examples of well known web browsers.

At least one of computer Systems 50 and 51 can be adapted (including programmed) to comprise a particular type of computer 53, i.e., a computer programmed to carry out the functions taught herein. The programming creates a new machine because even a general purpose computer in effect becomes a special purpose computer once it is programmed to perform particular functions pursuant to instructions from program software, thereby transforming particular data. The memory stores data according to a particular order or arrangement, and the programmed computer, e.g., 53, uses stored data to perform the particular functions. A data model provides the framework for organizing and representing information used by the programmed computer, e.g., 53. Data models define permissible data structures—organizational structures wherein the data used by the programmed computer, e.g., 53, reside and are organized for the particular functions. Data structures are the physical implementation of a data model's organization of the data and may, depending on the embodiment, be shared by more than one application program and/or programmed computer, e.g., 53. Thusly, the memory can, but need not in all embodiments, be structured so as to store a database arranged or ordered so as to fit the database for the designated task(s) i.e., function(s) of the programmed computer, e.g., 53. The designated task(s) comprise particular interaction among (if the embodiment of interest preferred for a particular application) an ad hoc interconnection of computers functionally separated, but collectively cooperating to carry out said designated task(s) as set forth below.

Computing herein comprises processing related cryptocurrency. Generally, a cryptocurrency is a medium of exchange designed around securely exchanging information which is a process made possible by certain principles of cryptography. A non-limiting example is Bitcoin, though there are numerous other cryptocurrencies. Cryptocurrencies are specifications regarding the use of currency which seek to incorporate principles of cryptography to implement a distributed, decentralized, and secure information economy. Thus, cryptocurrency can be used as a digital form of virtual currency that is electronically created and stored and communicated. Like traditional money these currencies may be used to buy physical goods and services but could also be restricted to certain communities such as for example for use inside an on-line game or social network.

By way of a teaching example, from which generalization is to be taken, consider Bitcoin. Bitcoin is a payment system in which payments in the system are recorded in a public ledger using its own unit of account, which is also called bitcoin. Payments work peer-to-peer without a central repository or single administrator. Bitcoins are created as a reward for payment processing work in which users offer their computing power to verify and record payments into the public ledger. Called mining, individuals or companies engage in this activity in exchange for transaction fees and newly created bitcoins. Besides mining, bitcoins can be obtained in exchange for currency which derives its value from government regulation or law.

Bitcoins can be bought and sold with many different currencies from individuals and companies. Bitcoins may be purchased in person or at a bitcoin ATM in exchange for the currency which derives its value from government regulation or law. Participants in online exchanges offer bitcoin buy and sell bids. Since bitcoin transactions are irreversible, sellers of bitcoins must take extra measures to ensure they have received traditional funds from the buyer.

Users can send and receive bitcoins electronically for an optional transaction fee using wallet software on a digital device, such as computer 53 or a web application also embraced by some embodiments herein.

While wallets are often described as being a place to hold or store bitcoins, bitcoins are inseparable from a block chain transaction ledger (a sequential transaction database found in cryptocurrencies, e.g., Bitcoin #The_block_chain_ledger. All bitcoin transfers are recorded in a computer file that acts as a public ledger called the block chain, which everyone can examine. Bitcoins are entries in the block chain and do not exist outside of it.

Perhaps a better way to define a wallet is something "that stores the digital credentials for your bitcoin holdings" and allows you to access (and spend) them. Bitcoin uses public-key cryptography in which two cryptographic keys, one public and one private, are generated. The public key can be thought of as an account number or name and the private key, ownership credentials. At its most basic level, a wallet can be understood as a collection of these keys. Most bitcoin software also includes the ability to make transactions, however. Note that this is a teaching illustration, and more generally, there are other cryptocurrencies and physical bitcoins.

Cryptocurrencies can use client software, e.g., Electrum and Bitcoin-Qt are sample bitcoin clients. Bitcoin client software, called a "bitcoin wallet," allows a user to transact bitcoins. A wallet program generates and stores private keys, and communicates with peers on the bitcoin network. The client can be used as a desktop wallet for payments or as a server utility for merchants and other payment services. Bitcoin-Qt, also called Satoshi client is sometimes referred to as the reference client because it serves to define the bitcoin protocol and acts as a standard for other implementations. As of version 0.9, Bitcoin-Qt has been renamed Bitcoin Core to more accurately describe its role in the network. Several server software implementations of the bitcoin protocol exist. So-called full nodes on the network validate transactions and blocks they receive, and relay them to connected peers.

When making a purchase, e.g., with a mobile device, QR codes (though as put forth herein, other graphical representations can be used) can be used to simplify transactions. QR code (abbreviated from "Quick Response Code") is a type of matrix barcode or two-dimensional barcode that is a machine-readable optical label that contains information about the item to which it is attached. A QR code uses four standardized encoding modes (numeric, alphanumeric, byte/binary, and kanji) to efficiently store data; extensions may also be used. A QR code has black modules (square dots) arranged in a square grid on a white background, which can be read by an imaging device (such as a camera) and processed using Reed-Solomon error correction until the image can be appropriately interpreted. The required data are then extracted from patterns present in both horizontal and vertical components of the image.

Ownership of bitcoins is associated with a certain bitcoin address that can be demonstrated with knowledge of the private key belonging to the address. Integral to bitcoin security is the prevention of unauthorized transactions from an individual's wallet. A bitcoin transaction permanently transfers ownership to a new address, a string having the form of random letters and numbers derived from public keys by application of a hash function and encoding scheme. The corresponding private keys act as a safeguard for the owner; a valid payment message from an address must contain the associated public key and a digital signature proving possession of the associated private key. Because anyone with a private key can spend all of the bitcoins associated with the corresponding address, protection of private keys is quite important.

To teach by illustration for embodiments which can, but need not always, be carried out with such as a computer system 50 including a digital computer 55 operably associated with an input device and with an output device and with a connection to an Internet-type network to computer system. The computer is a programmed computer and has access to memory, wherein resides a database with a data structure as described above. The task(s) can be as follows: receiving a notification of a payment comprising an amount of cryptocurrency and a first cryptocurrency address, and then effectuating a purchase by using the amount and the cryptocurrency address from which a first public key can be derived (the purchase data is stored in the database in the structure configured therefore), and verifying of the identity of the purchaser, in this case, a digitally represented (via computer) human or entity.

The verifying can be carried out with the implementation preferred for one application or another. One approach (A) can be carried out with the cryptocurrency address (i.e., a first cryptocurrency address), and receiving a second (or another) cryptocurrency payment from the first cryptocurrency address, and deriving a second public key from the second (or other) payment; determining whether the second derived public key matches with either the first public key or the cryptocurrency address of the payment comprising the amount, such that if there is a match, then producing output indicating verification that the digitally represented human or entity purporting to have made the purchase is entitled to obtain value for the purchase; and otherwise do not produce the output. A variation on the theme can include creating a second cryptocurrency address, communicating the second cryptocurrency address to the digitally represented person or entity purporting to have made the purchase, and then monitoring the second cryptocurrency address for a second cryptocurrency payment from the first cryptocurrency address, deriving a second public key from the second payment, etc.

Another approach (B) can be carried out by creating, at the computer a message, communicating the message to the digitally represented person or entity purporting to have made the purchase, and then receiving from the digitally represented person or entity provided with the message a signed return of the message; deriving the second public key from the signed message; and determining whether the second derived public key matches with either the first public key or the cryptocurrency address of the payment comprising the amount, such that if there is a match, then producing output indicating verification that the digitally represented human or entity purporting to have made the purchase is entitled to obtain value for the purchase; and otherwise do not produce the output.

Figure 3:
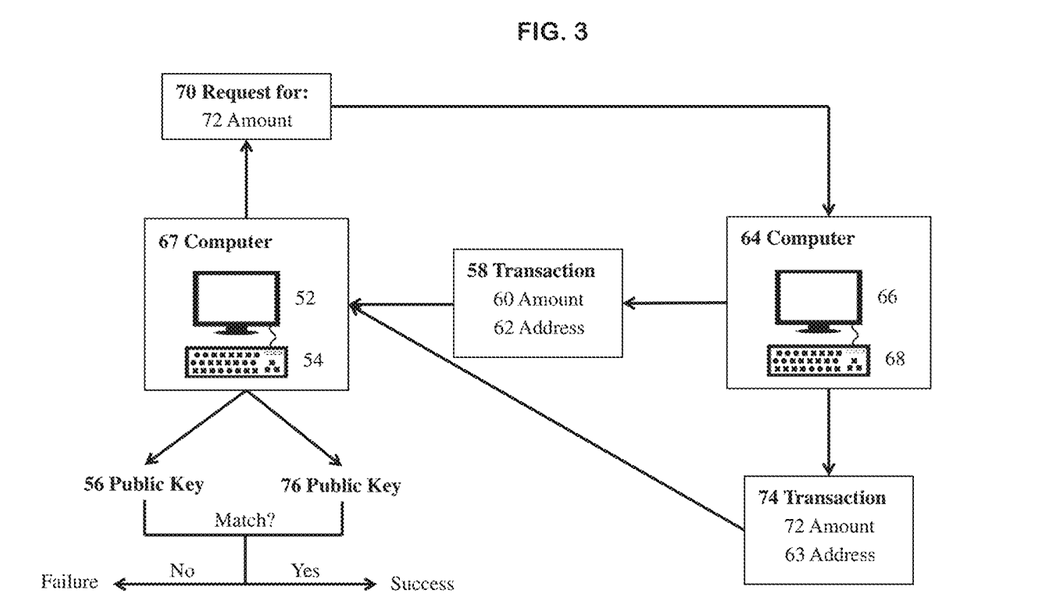
FIG. 3 is an illustration of verification system.
Figure 4:
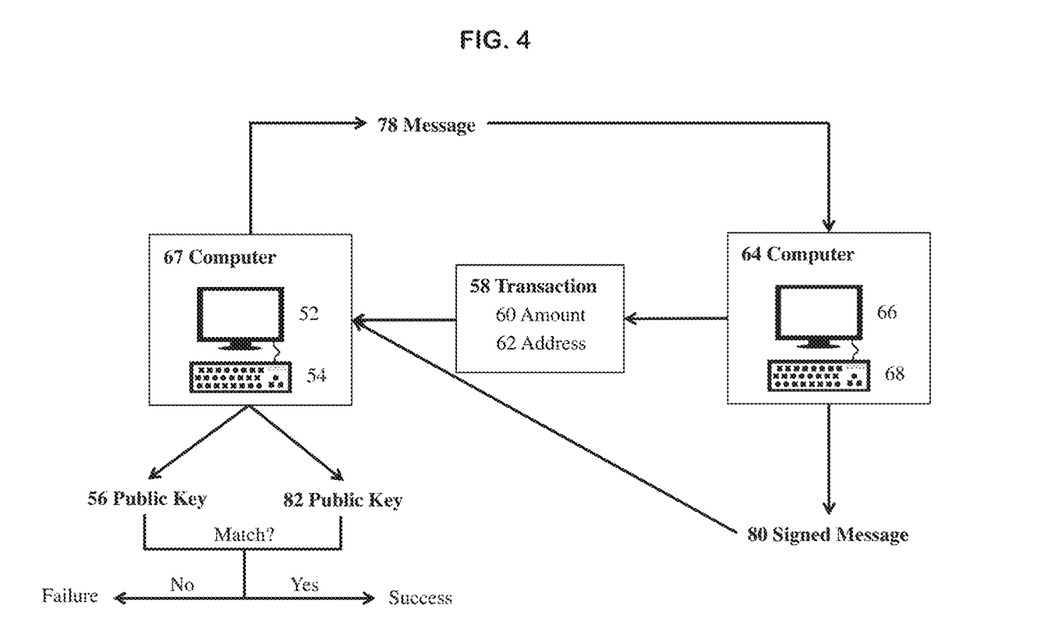
FIG. 4 is an illustration of another verification system.

More particularly, attention is drawn to FIG. 3, which illustrates an apparatus, i.e., machine, including a computer system which includes digital computer 50 operably associated with an input device 54 and an output device 52, and equipped with a connection to an Internet-type network. The computer is programmed to become a special purpose computer thereby adapted to carry out the operations of receiving a notification of payment 58 comprising an amount 60 of cryptocurrency and a first cryptocurrency address 62, and then effectuating a purchase by using amount 60 and the address 62 from which a first public key 56 can be derived, and verifying that a digitally represented human or entity using computer system 64 (comprising of output device 66 and input device 68) purporting to have made payment 58 is entitled to obtain value for the purchase. The verifying can include receiving a second cryptocurrency address 63 for a second cryptocurrency payment 74 from the first cryptocurrency address 62, and deriving a second public key 76 from the same payment 74. As illustrated in FIG. 4, the verifying includes creating message 78, communicating the message 78 to the digitally represented person or entity purporting to have made the purchase (who is using computer 64), and then receiving from the digitally represented person or entity provided with the message a signed return of the message in the form of signed message 80, and deriving the second public key 82 from the signed message; and determining whether the second derived public key (marked on FIG. 3 as 76 for verification method A, and marked on FIG. 4 as 82 for method B) matches with either the first public key 56 or the cryptocurrency address of the payment comprising the amount, such that if there is a match, then producing output indicating verification that the digitally represented human or entity purporting to have made the purchase is entitled to obtain value for the purchase; and otherwise do not produce the output.

In some, but not all embodiments the apparatus can be programmed such that the verifying includes deriving the second public key 76 from the second payment. Further the cryptocurrency address 62 can be a first cryptocurrency address, and the operations can further include creating a second cryptocurrency address 63, communicating the second cryptocurrency address 63 to a person or entity purporting to have made the purchase, and then monitoring the second cryptocurrency address 63 for the second cryptocurrency payment 74 from the first cryptocurrency address 62.

And in other embodiments, there can be a process for using a machine. The process includes applying a computer system to verify that a digitally represented human or entity purporting to have made a purchase using computer 64 with cryptocurrency is entitled to obtain value for the purchase, the computer system including a digital computer 50 operably associated with an input device 54 and with an output device 52 and with a connection to an Internet-type network. The computer is programmed to form a special purpose computer such that the computer system 50 is enabled to carry out the verifying by steps including: receiving, by the computer over the network, a notification of a payment 58 comprising an amount 60 of cryptocurrency and a first cryptocurrency address 62, and then effectuating, by the computer, the purchase by using the amount 60 and the cryptocurrency address 62 from which a first public key 56 can be derived, and verifying, by the computer, that the digitally represented human or entity purporting to have made the purchase is entitled to obtain value for the purchase, the verifying comprising: (A) receiving a second cryptocurrency address 63 for a second cryptocurrency payment 74 from the first cryptocurrency address 62, and deriving a second public key 76 from the second payment; and/or (B) creating a message 78, communicating the message to the digitally represented person or entity purporting to have made the purchase, and then receiving from the digitally represented person or entity provided with the message a signed return 80 of the message, and deriving the second public key 82 from signed message 80; and determining whether the second derived public key 82 matches with either the first public key 56 or the cryptocurrency address 63 of the payment comprising the amount. The operations are carried out such that if there is a match, then producing output, at the output device 52, indicating verification that the digitally represented human or entity purporting to have made the purchase with computer 64 is entitled to obtain value for the purchase; and otherwise do not produce the output.

In another manner of articulation for the principles herein, some, but not all, embodiments can be such that the medium of message 78 relayed to the digitally represented person or entity making the purchase is not limited to text, but rather includes the reception of a file from the entity providing the product or service. The content of such a file can include a license key generated by the seller entity unique to the transaction at hand, and then be sent to the digitally represented buyer at computer 64 to solicit a signature by utilizing the client's private keys, in the same manner as a text-based message would be signed by the buying entity, a process described in verification method "(B)" of claim 1, and serve to derive a second public key 82 from the signed file 80 returned to the producer entity, from which the first public key 56, received in the initial transaction, can be compared to the aforementioned second public key 82 to determine a match, and then if there is a match, then producing output, at the output device 52, indicating verification that the digitally represented human or entity purporting to have made the purchase with computer 64 is entitled to obtain value for the purchase; and otherwise do not produce the output.

Turning now to FIG. 3, there is an illustration of verification method A, which may, depending on the implementation preferred, be carried out such that 50 represents a computer specially adapted for the entity selling the product or service. Computer 50 is operably associated with input device 54 and output device 52. Computer 64 represents a computer specially adapted for the entity buying the product or service. Computer 64 is operably associated with input device 68 and output device 66. Item 58 is a cryptocurrency transaction sent initially by computer 64 to computer 50 to make the purchase of the product or service in question. The transaction also includes 60—the amount of Bitcoin or other cryptocurrency sent to make the purchase, as well as address 62 that identifies the identity of the entity using computer 64 to make that purchase. Public key 56 generated by computer 50 from transaction 58 upon its reception. Request 70 is the request that computer 50 sends back to computer 64 for amount 72 of Bitcoin or other cryptocurrency. Computer 64 then makes a second transaction 74 with the amount 72 requested and associates the transaction with address 63. The second public key 76 generated by computer 50 upon receiving second transaction 74. Public key 56 and second public key 76 are compared for a match. If these keys 56 and 76 match, the transaction is successful and a message indicating a successful verification is generated. Otherwise, the transaction verification fails.

Turning now to FIG. 4, there is an illustration of verification method B. Message 78 does not have to take the form of a textual message, but can rather be a file with a license key unique to the transaction. The contents of that file go through the same verification process as a textual message would. Computer 50 is specially adapted for the entity selling the product or service. Computer 50 is operably associated with input device 54 and output device 52. Computer 64 is specially adapted for the entity buying the product or service. Computer 64 is associated with input device 68 and output device 66. A cryptocurrency transaction 58 is sent initially by computer 64 to computer 50 to make the purchase of the product or service in question. The transaction also includes 60—the amount of Bitcoin or other cryptocurrency sent to make the purchase, as well as address 62 that identifies the identity of the entity using computer 64 to make that purchase. Public Key 56 is the public key generated by computer 50 from transaction 58 upon its reception. Message 78 that computer 50 sends back to computer 64. Computer 64 then uses its private keys to sign message 78. Signed message 80 that results and is sent from computer 64 back to computer 50. The second public key 82 is generated by computer 50 upon receiving signed message 80. Keys 56 and 82 are compared for a match. If these keys match, the transaction is successful and a message indicating a successful verification is generated. Otherwise, the transaction verification fails.

Yet another manner of articulation is as follows:
The Purchase

<amount> + <public key / address> = <transaction>
<transaction> * <private key> = <signed transaction (private key now hidden)>
<signed transaction> –> Database = purchase Having access to the database, now there is access to the signed transaction, which contains the amount and the public key and address.
The Verification
"I, the (human or entity purchaser), made this purchase."*<private key>=<signature (private key now hidden)>
<signature>->Database
Now there is access to the signature.

<signature> * <public key> = <message>
if (<message> == "I, (human or entity), made this purchase.") Success!
Else Failure!

The Verification (Transaction Method)

<small amount> + <public key / address> = <small transaction>
<small transaction> + <private key> = <signed small transaction>

When the purchaser is ready to receive the product:
<signed small transaction>->Database
There can be a verification, due to the signature, that this transaction came from the right human or entity.

For extra verification, there can be a multi-signature implementation, in which two sets of private and public keys are used: one set for making purchaser and the other set for a recipient of the purchase. Communications for key usages by both parties will occur in sequence.

Figure 2:
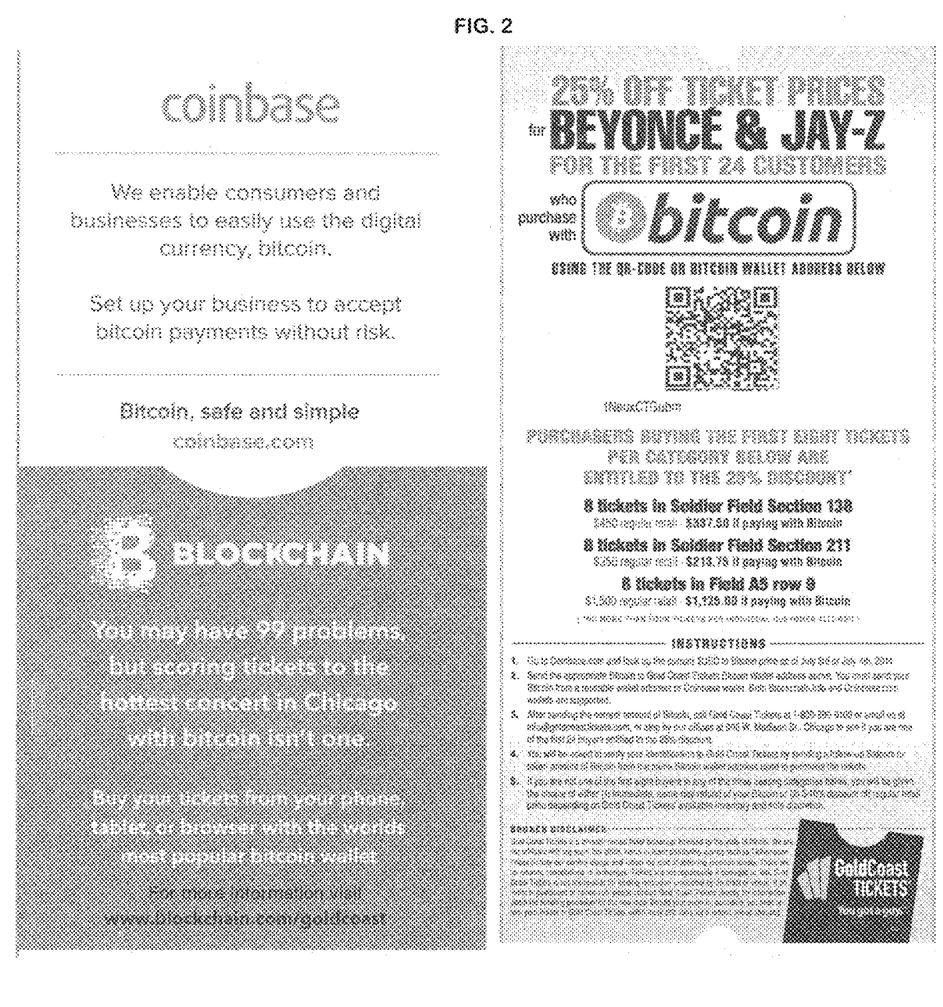
FIG. 2 is an illustration with regard to a physical encounter (advertisement) that initiates a digital action.

The foregoing can be carried out, for example, with respect to a physical encounter that initiates a digital action, and a nonlimiting, teaching example is provided in FIG. 2 as a print advertisement. (Other implementations can include really any image that is digital or in print, in a media such as a billboard or a magazine/newspaper, that is readable by the computer system making the purchase.) The advertisement includes a graphical representation of a cryptocurrency wallet address, in this case, a QR code, in connection with an offer for a purchase and an indication of how the offer can be accepted. The advertisement—or at least the graphical representation—can, but need not always, be created by the computer system that receives the above-mentioned purchase.

The advertisement, or more particularly the graphical representation, can be read (photographed, scanned) by an input device of the computer system corresponding to a buyer, the computer system in some cases being mobile device such as a cellular telephone, Ipad, or the like, enabling individuals to transact commerce directly with, say, a newspaper—with print, via the capabilities of a cryptocurrency such as Bitcoin. Thus, an advertisement that includes a QR code enables readers to purchase items directly from the advertisement (graphical representation, in this case in print) by using cryptocurrency. Direct newspaper ecommerce is thereby enabled.

Subsequently, the above-mentioned verifying can be carried out by the buyer scanning the graphical representation again for verification purposes, responding to the message, sending a second payment (e.g., a micropayment), etc. In some cases, the initial payment amount can be for all of the price, and in other embodiments, the amount can be for some of the price for the value and the second payment can be for a remainder the price for the value, and in both cases there can be a handling or processing fee added.

In embodiments employing a discount or reward, as illustrated in FIG. 2, for making the purchase prior to other purchasers, and the computer system can be programmed to carry out the discount or reward by counting the purchases up to a limit and granting the discount or reward to purchases up to the limit. If the verified human or entity that made the purchase is entitled to the discount or reward, then there can be a refund or alternative use of the cryptocurrency in an amount reflecting the discount or reward. If the verified human or entity that made the purchase is not among those entitled to the discount or reward, then there can be a refund or alternative use of the cryptocurrency that does not reflect the discount or reward. A refund is a reverse of the purchase, utilizing the cryptocurrency and cryptocurrency address of the purchase. Again there may be a fee added to any of the foregoing. In some embodiments, alternative use of the cryptocurrency (with or without some refund) can be such as a banking (storage), or application of at least some of the cryptocurrency to another purchase, another discount or reward, etc.

Note that the purchase need not be limited to goods, and for example can be used in connection with access control for the actual human or entity, e.g., human admission to a performance, a transportation system (e.g., bus or fare payment for admission to the bus or metro, admission to a performance, etc.)

Figure 5:
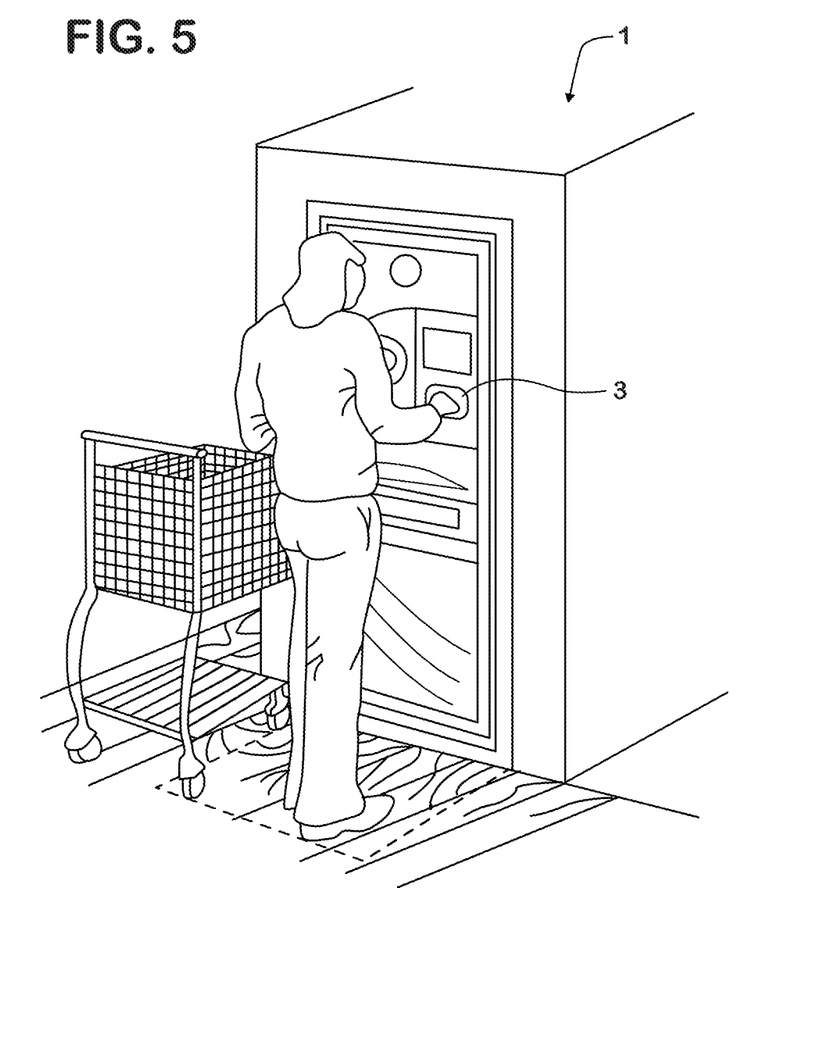
FIG. 5 is an illustration with regard to computer(s) implementation at a vending machine.

Further including a vending machine application for totally automated purchase through obtaining the value of the purchase. Turn to FIG. 5, which shows a vending machine adaptation of a buyer's 1 computer system, wherein an imaging device 3 as an input device is depicted. The imaging device can be employed to read the graphical representation a second time for verification, to initiate obtaining the value, e.g., printing a ticket to a performance or obtaining or adding fare to a metro card. In such an embodiment, the vending machine automates a "will call" function at a box office or the like. In other embodiments, the vending machine computer system 1 can carry out the entire cryptocurrency transaction, including making the purchase and obtaining the value with the verifying if deemed suitable to the particular application.

Yet another embodiments can add one or more service layers to the cryptocurrency system discussed above. One service layer can direct a portion of the crytocurrency to a charity wallet, as part of the purchase transaction for other value, or as a donation, e.g., responsive to the graphical representation. Another service layer may implement a "smart contract," implemented by script, which may or may not as may be desired, include payments made in cryptocurrency with one or more time delays. A further layer, if so desired, can include a digital search to identify the graphical representation corresponding to a desired purchase, utilizing an image recognition application at the client side, e.g., an Amazon flow application, to identify that which is to be purchased and identification of a graphical representation so as to identify, and then carry out the cryptocurrency purchase.

As mentioned there can be a database having data structures used to carry out the operations efficiently. The database structure can be structured to accommodate such as public keys associated with a respective purchase, date of the purchase, amount of the purchase, blockchain or the like, transaction identifier, and verification information, depending on the manner of verification employed.

Embodiments can be implemented in the form of control logic in software or hardware or a combination of both. The control logic may be stored in an information storage medium, such as a computer-readable medium, e.g., a non-transient medium, as a plurality of instructions adapted to direct an information processing device to perform a set of steps or operations. Based on the disclosure and teachings provided herein, a person of ordinary skill in the art will appreciate other ways and/or methods to implement an equivalent.

A "processor" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present invention.

Embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the disclosure herein to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract are not intended to be exhaustive or to limit the invention to the precise forms disclosed herein. While specific embodiments of, and examples for, the invention are described herein for teaching-by-illustration purposes only, various equivalent modifications are possible within the spirit and scope of the present invention, as those skilled in the relevant art will recognize and appreciate. As indicated, these modifications may be made in light of the foregoing description of illustrated embodiments and are to be included within the true spirit and scope of the invention.

Accordingly, appreciation is requested for the robust range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined herein.

Thus, although illustrative embodiments have been described in detail above, it is respectfully requested that appreciation be given for the modifications that can be made based on the exemplary embodiments, implementations, and variations, without materially departing from the novel teachings and advantages herein. Accordingly, such modifications are intended to be included within the scope herein. Also herein, means-plus-function language is intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

We claim:

1. An apparatus comprising:
a computer system including a computer operably associated with an input device, an output device, and a connection to a network, the computer system operable to perform:
receiving a notification of a payment that includes an amount of cryptocurrency and a first cryptocurrency address, wherein the first cryptocurrency address is associated with a first public key of a public/private key pair; and
effectuating a purchase by using the amount and the first cryptocurrency address, and verifying that a digitally represented person or entity purporting to have made the purchase is entitled to obtain value for the purchase, wherein the verifying includes at:
generating a request for a second amount of cryptocurrency;
sending the request to the digitally represented person or entity purporting to have made the purchase;
receiving from the digitally represented person or entity purporting to have made the purchase a second cryptocurrency payment from the first cryptocurrency address, wherein the second cryptocurrency payment includes the second amount, wherein the digitally represented person or entity purporting to have made the purchase signs the second cryptocurrency payment to produce a signed transaction, and wherein a second public key is associated with the signed transaction;
determining whether the second public key matches with the first public key, wherein the second public key matching the first public key indicates that the digitally represented person or entity is in possession of a private key of the public/private key pair;
when the match is determined, indicating verification that the digitally represented human or entity purporting to have made the purchase is entitled to obtain value for the purchase; and
when the match is not determined, performing one or more of producing no output and indicating a failure.

2. The apparatus of claim 1, wherein the generating the request for the second amount of cryptocurrency further comprises:
creating a second cryptocurrency address; and
monitoring the second cryptocurrency address for the second cryptocurrency payment from the first cryptocurrency address.

3. A method comprising:
verifying, by a computer system, that a digitally represented person or entity purporting to have made a purchase with cryptocurrency is entitled to obtain value for the purchase, the computer system including a computer operably associated with an input device, an output device, and a connection to a network, the computer programmed such that the computer system is enabled to carry out the verifying by steps including:
receiving, by the computer over the network, a notification of a payment that includes an amount of cryptocurrency and a first cryptocurrency address, wherein the first cryptocurrency address is associated with a first public key of a public/private key pair; and
effectuating, by the computer, the purchase by using the amount and the first cryptocurrency address, and verifying, by the computer, that the digitally represented human or entity purporting to have made the purchase is entitled to obtain value for the purchase, wherein the verifying includes:
generating a request for a second amount of cryptocurrency;
sending the request to the digitally represented person or entity purporting to have made the purchase;
receiving from the digitally represented person or entity purporting to have made the purchase a second cryptocurrency payment from the first cryptocurrency address, wherein the second cryptocurrency payment includes the second amount, wherein the digitally represented person or entity purporting to have made the purchase signs the second cryptocurrency payment to produce a signed transaction, and wherein a second public key is associated with the signed transaction;

determining whether the second public key matches with the first public key, wherein the second public key matching the first public key indicates that the digitally represented person or entity is in possession of a private key of the public/private key pair;

when the match is determined, indicating verification that the digitally represented human or entity purporting to have made the purchase is entitled to obtain value for the purchase; and when the match is not determined, performing one or more of producing no output and indicating a failure.

4. The method of claim 3, wherein the generating the request further comprises:
creating a second cryptocurrency address for receiving the second cryptocurrency payment.

5. The method of claim 3, wherein the request further includes a graphical representation of a second cryptocurrency address.

6. The method of claim 3, wherein the verifying further includes:
creating a message;
communicating the message to the digitally represented person or entity purporting to have made the purchase; and
receiving from the digitally represented person or entity provided with the message a signed return of the message, wherein the second public key is associated with the signed message.

7. The method of claim 3, wherein the verifying the digitally represented human or entity is entitled to obtain value for the purchase further comprises:
performing a verifying function on at least one of the signed message, the second public key, and the message or the signed transaction, the second public key and the second cryptocurrency payment to validate whether the digitally represented person or entity is in possession of the private key of the public/private key pair that includes the second public key.

8. The method of claim 3, wherein the receiving the signed return of the message further comprises:
receiving a file which contains the signed return; and
extracting the signed return from the file.

9. The method of claim 3 further comprises:
retrieving, from a database, one or more of the second public key, the signed message, an encoding scheme, and the signed transaction.

10. The apparatus of claim 1, wherein the verifying further includes:
creating a message;
communicating the message to the digitally represented person or entity purporting to have made the purchase; and
receiving from the digitally represented person or entity provided with the message a signed return of the message, wherein the second public key is associated with the signed message.

11. The apparatus of claim 6, wherein the computer system is further operable to verify that the digitally represented human or entity is entitled to obtain value for the purchase by:
performing a verifying function on at least one of the signed message, the second public key, and the message or the signed transaction, the second public key and the second cryptocurrency payment to validate whether the digitally represented person or entity is in possession of the private key of the public/private key pair that includes the second public key.

12. The apparatus of claim 10, wherein the receiving the signed return of the message further includes receiving a file which contains the signed return, and extracting the signed return from the file.

* * * * *